US008793466B2

(12) United States Patent
Shao et al.

(10) Patent No.: US 8,793,466 B2
(45) Date of Patent: Jul. 29, 2014

(54) EFFICIENT DATA OBJECT STORAGE AND RETRIEVAL

(75) Inventors: Minglong Shao, San Jose, CA (US); Garth R Goodson, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 151 days.

(21) Appl. No.: 13/458,323

(22) Filed: Apr. 27, 2012

(65) Prior Publication Data

US 2013/0290648 A1 Oct. 31, 2013

(51) Int. Cl.
| G06F 12/00 | (2006.01) |
| G06F 9/26 | (2006.01) |
| G06F 9/34 | (2006.01) |
| G06F 13/00 | (2006.01) |
| G06F 13/28 | (2006.01) |
| G06F 12/04 | (2006.01) |

(52) U.S. Cl.
CPC ................................ G06F 12/04 (2013.01)
USPC ........... 711/201; 711/154; 711/170; 711/171; 711/172; 711/173

(58) Field of Classification Search
CPC ............ G06F 17/30091; G06F 17/30097; G06F 17/30156; G06F 17/30949; G06F 17/30952; G06F 12/0866; G06F 3/0613; G06F 3/0661; G06F 3/067; G06F 12/04
See application file for complete search history.

(56) References Cited

U.S. PATENT DOCUMENTS

| 2008/0208924 A1 | 8/2008 | Bradshaw et al. |
| 2008/0270461 A1 | 10/2008 | Gordon et al. |
| 2010/0235569 A1* | 9/2010 | Nishimoto et al. ........... 711/103 |
| 2010/0332818 A1 | 12/2010 | Prahlad et al. |
| 2011/0022566 A1* | 1/2011 | Beaverson et al. ........... 707/639 |
| 2011/0040795 A1 | 2/2011 | Gordon et al. |
| 2013/0067159 A1* | 3/2013 | Mehra ........................... 711/114 |

FOREIGN PATENT DOCUMENTS

WO WO-2004036408 A2 4/2004

OTHER PUBLICATIONS

International Search Report in application PCT/US2013/036832 dated Jul. 15, 2013, pp. 1-3.
Written Opinion in application PCT/US2012/054927 dated Jul. 15, 2013, pp. 1-5.
Written Opinion in application PCT/US2013/036832 dated Jul. 15, 2013, pp. 1-5.
Welsh, M., et al., "SEDA: An Architecture for Well Conditioned, Scalable Internet Services", Proceedings of the Eighteenth Symposium on Operating Systems Principles (SOSP), Oct. 2001, 14 pages.
Harizopoulos, S., et al., "A Case for Staged Database Systems", Proceedings of the First International Conference on Innovative Data Systems Research (CIDR), 2003, 12 pages.

* cited by examiner

*Primary Examiner* — Yaima Rigol
(74) *Attorney, Agent, or Firm* — Perkins Coie LLP

(57) ABSTRACT

A data storage system includes a processor, a system memory, and logical extents. Blocks of storage in one or more physical storage devices are allocated to each of the logical extents. The processor maintains a logical container for data objects and the volume includes one or more of the logical extents. The processor stores data objects that are uniquely identified by object identifiers in the logical extents. The processor also maintains a first index that is stored in the system memory and maps a range of the object identifiers to a second index. The second index is also stored in a logical extent and indicates storage locations of the data objects associated with the range of the object identifiers.

28 Claims, 9 Drawing Sheets

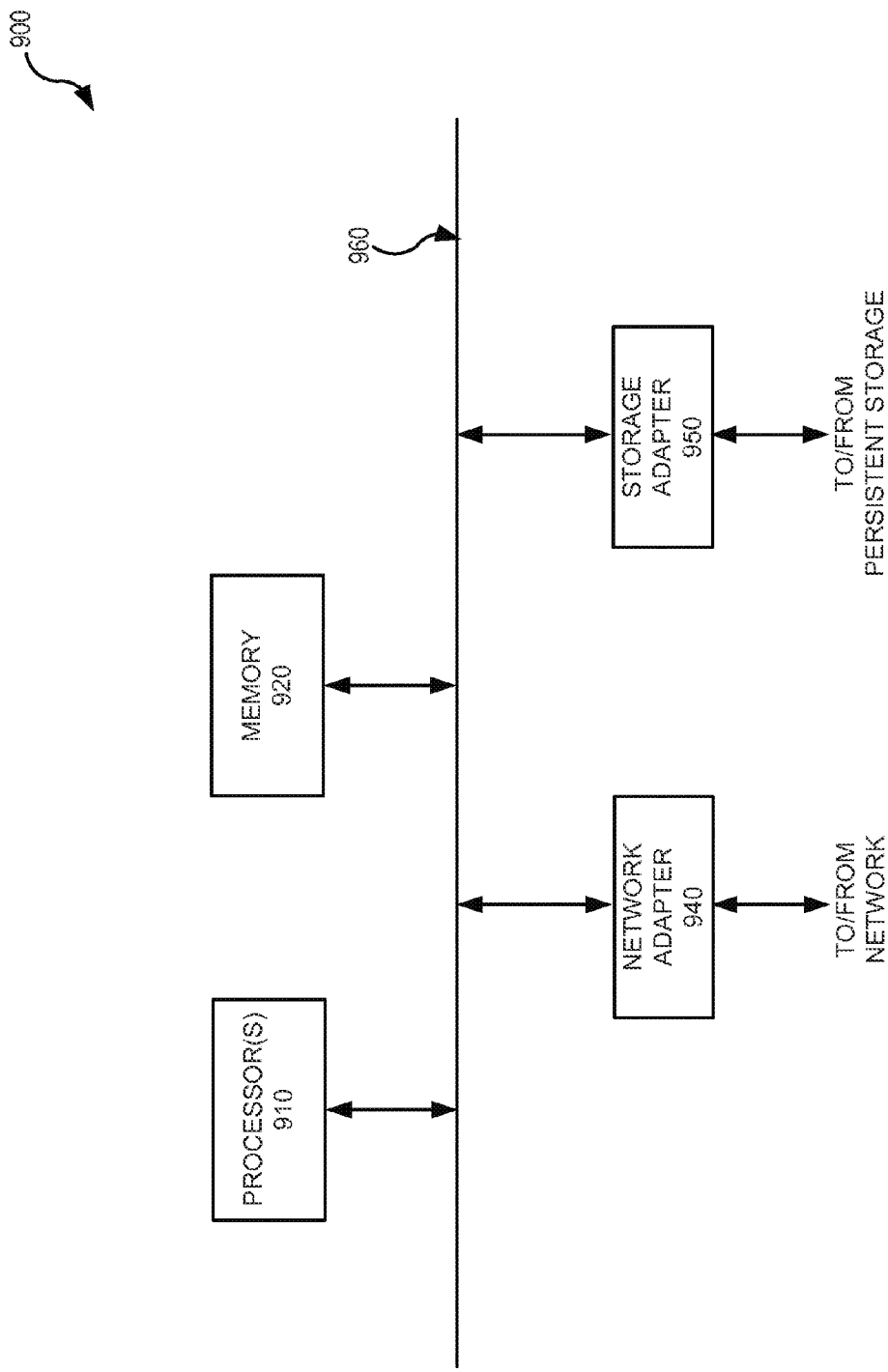

EFFICIENT DATA OBJECT STORAGE AND RETRIEVAL

CROSS-REFERENCE TO RELATED APPLICATION

This application claims priority to U.S. patent application Ser. No. 13/458,323 filed 27 Apr. 2012, which is hereby incorporated by reference in its entirety.

FIELD OF THE INVENTION

At least one embodiment of the present invention pertains to data storage systems, and more particularly, to a technique for efficiently storing data objects in a data storage system.

BACKGROUND

Network storage is a common approach to backing up data and making large amounts of data accessible to a variety of clients. In a network storage environment, a storage server makes data available to client systems by presenting or exporting to the clients one or more logical containers of data. A storage server also receives data from client systems for storage. There are various forms of network storage, including network attached storage (NAS) and storage area network (SAN). In a NAS context, a storage server services file-level requests from clients. In a SAN context, a storage server services block-level requests. Some storage servers are capable of servicing both file-level requests and block-level requests.

The technology marketplace has been experiencing several trends that impact existing network storage technologies. First, the amount of data which is stored using network storage systems continues to increase. Second, the number of applications in which data objects are retrieved in random fashion is also increasing. Applications such as photo archives provide storage for very large numbers of data objects which are often accessed randomly. In some cases, these data objects are also modified infrequently. Conventional file system layouts have been shown to be inefficient for storing and retrieving data objects under these circumstances. The hierarchical namespace and inode structure used in many conventional file system layouts requires three or more disk input/output (I/O) operations to store or retrieve a data object. One I/O is typically required to retrieve information necessary to translate the name of the data object to an inode. A second I/O is necessary to retrieve the inode structure. At least a third I/O is typically required to retrieve the data object. These conventional layouts also typically include storage of metadata attributes that may not be needed in these applications.

In addition, it is becoming more important for network storage systems to be highly adaptable to different applications and performance profiles. Conventional network storage systems each generally use a single data layout, which may be adequate for some uses but is generally not optimal for the many different configurations the marketplace requires. Consequently, a network storage system designer must make various design choices about how the various potential uses of the system should drive the design. These choices will then determine the performance characteristics of the system. It is very difficult, if not impossible, to change the resulting system operation characteristics once the design has been implemented and productized.

SUMMARY

Introduced below is a file system layout for storing objects in a network storage system, and associated methods and apparatus. Various apparatuses and methods for implementing the file system layout are collectively called "the system introduced here" or simply "the system" in the discussion which follows. The system provides efficient data object storage and retrieval in a flexible data layout that can be modified to meet the various needs of different use cases. Among other features, the system stores data objects in extents and manages them using a non-hierarchical structure. The system improves efficiency by reducing the number of input/output operations (I/Os) required to store or retrieve a data object in a mass storage facility and reducing the amount of storage space needed to store data objects in comparison to certain conventional systems. An I/O is an operation which requires communication between an information processing device, such as a processor, and another device. In data storage systems, I/Os often refer to communications between a storage server and storage devices. However, other types of I/Os are possible. Although benefits associated with the system may be realized in many applications, the system is particularly well suited to applications involving frequent random access of data objects. It is particularly useful in applications where a reduced amount of metadata is needed for each data object.

The system is based in part on recognition that I/Os are relatively time consuming and inefficient as compared to retrieving data from other types of memory that may be internal to a storage server. Disk I/Os are particularly time consuming due to the inherent latency associated with randomly accessing data objects on rotating storage media. While solid state memory has much faster response times, it is typically much more expensive, on a per megabyte basis. Consequently solid state memory has more limited availability than disk-based storage space in a data storage system and must be used more selectively. The system introduced here implements a file system layout in which the location of data objects can be managed using two indexes. An index is a list which identifies storage locations of one or more pieces of information. The first of the two indexes is small enough to be maintained within system memory of the storage server. In this implementation, retrieving a data object using the two indexes still requires three steps: one to access the first index, one to access the second index, and one to retrieve the data object. However, since the first index is stored in a memory location which can be performed without performing an I/O, only two I/Os are required to retrieve the data object. Reducing the number of disk I/Os improves the overall performance of the storage system. Reducing the metadata-to-data ratio of a data object also allows caching to be more effective, since more data can be stored in memory In addition, the second index has a density such that it, or portions of it, may be cached in system memory. If a portion of the second index needed to access a data object is available in system memory, the number of I/Os necessary to access the data object can be further reduced. When data objects that are subsequently accessed exhibit locality, a performance benefit may be obtained from even a portion of the second index which is cached.

The system uses logical constructs for data, including "logical extents" (also called simply "extents"), "regions", and "slabs". An extent is the basic storage management unit of the system. Regions contain one or more logical extents of data. A slab is a collection of physical blocks of one or more physical storage devices and is the unit of physical storage apportioned to individual regions. An extent is allocated to at least a portion of one or more slabs that make up the region that includes the logical extent. The system may also maintain multiple "volumes" as logical containers of data in a volume layer above the region layer. Each volume may include one or more of the logical extents from one or more of the regions. Each volume may be tailored to provide certain performance characteristics.

The system is well suited for applications such as photo storage which involve many data objects which are frequently accessed randomly. The system is also well suited to applications which require less additional metadata to be stored in conjunction with the data objects and applications in which the data objects are infrequently modified.

In one embodiment the system includes a processor, a system memory, and logical extents. Blocks of storage in one or more physical storage devices are allocated to each of the logical extents. The processor maintains a volume as a logical container for data objects and the volume includes one or more of the logical extents. The processor stores data objects that are uniquely identified by object identifiers in the logical extents. The processor also maintains a first index that is stored in the system memory and maps a range of the object identifiers to a second index. The second index is also stored in a logical extent and indicates storage locations of the data objects associated with the range of the object identifiers.

Other aspects of the technique will be apparent from the accompanying figures and from the detailed description which follows.

BRIEF DESCRIPTION OF THE DRAWINGS

One or more embodiments of the present invention will be described and explained through the use of the accompanying drawings in which:

FIG. 9 is a block diagram of a storage server that may be used to implement the techniques introduced here.

DETAILED DESCRIPTION

References in this specification to "an embodiment", "one embodiment", or the like, mean that the particular feature, structure, or characteristic being described is included in at least one embodiment of the present invention. Occurrences of such phrases in this specification do not necessarily all refer to the same embodiment.

The system introduced herein provides a file system layout for storing objects in a network storage system. The system provides efficient data object storage and retrieval in a flexible data layout that can be modified to meet the needs of different use cases. The system accomplishes this, in part, by storing data objects in logical extents and managing the locations of the data objects with a non-hierarchical file structure which uses two indexes for locating the data objects and reduces the amount of storage space needed to store data objects.

The system improves efficiency over conventional file layout systems by reducing the number of disk I/Os required to access data object and reduces the amount of storage space needed to store data objects by reducing the amount of metadata associated with each object. The system provides a flat namespace file layout which is non-hierarchical in nature and is not burdened by the metadata overhead which accompanies the paths, path names, and directories typically associated with hierarchical file layout systems. In one embodiment these benefits are accomplished by managing file layout using two simple indexes. The two indexes are structured such that one of them is small enough, in many cases, to be stored in low latency system memory (e.g., RAM). In this way, a data object may be accessed in as few as two disk I/Os. Conventional, hierarchical file system layouts typically require three or more disk I/Os in order to an access a data object. The system implements the two index structure in conjunction with a volume which uses logical extents for storage of the data objects.

Figure 1:
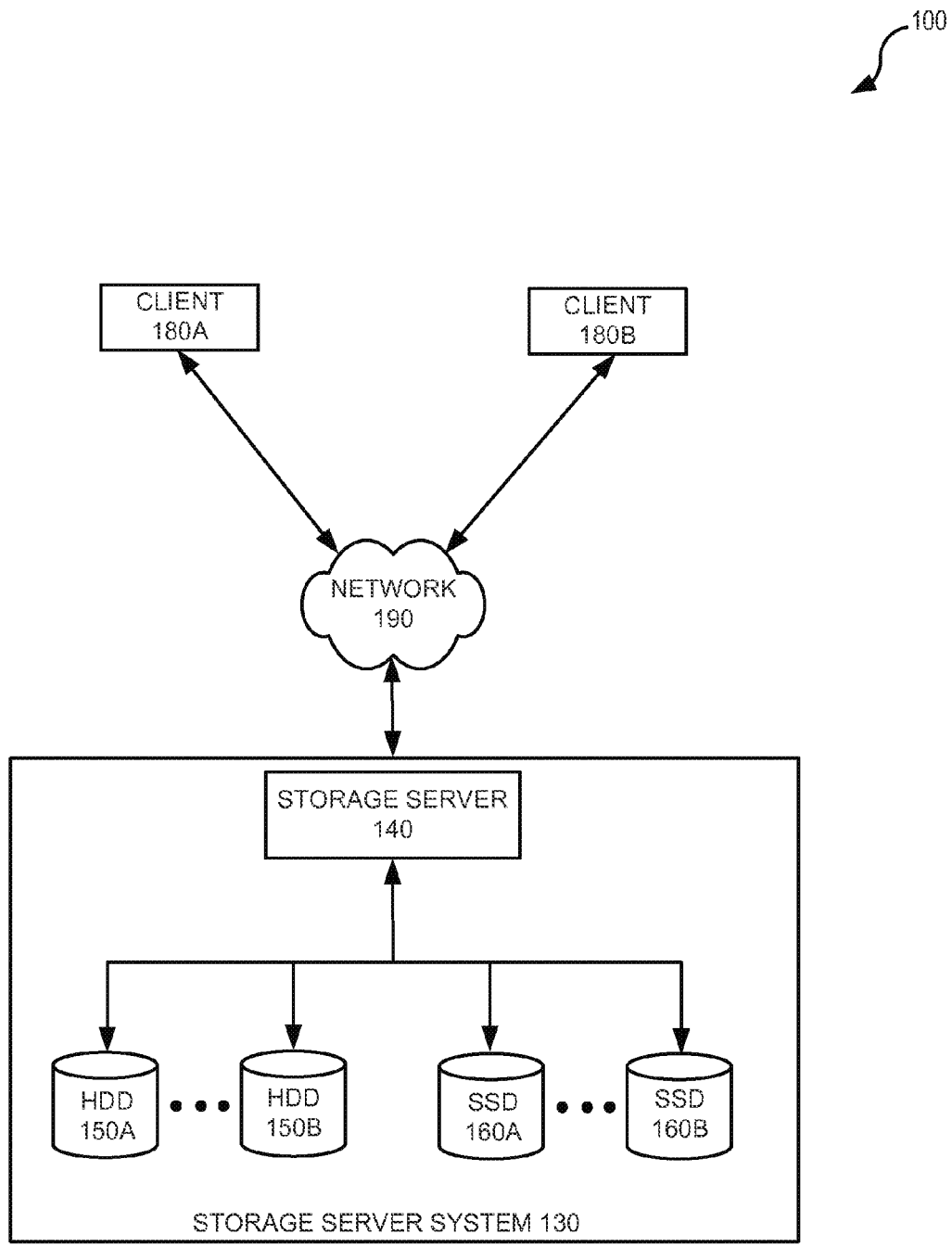
FIG. 1 illustrates a network storage environment in which the present invention can be implemented.

FIG. 1 illustrates an operating environment 100 in which some embodiments of the techniques introduced here may be utilized. Operating environment 100 includes storage server system 130, clients 180A and 1808, and network 190.

Storage server system 130 includes storage server 140, hard disk drive (HDD) 150A, HDD 150B, solid-state drive (SSD) 160A, and SSD 160B. Storage server system 130 may also include other devices or storage components of different types which are used to manage, contain, or provide access to data or data storage resources. Storage server 140 is a computing device that includes a storage operating system that implements one or more file systems. Storage server 140 may be a server-class computer that provides storage services relating to the organization of information on writable, persistent storage media such as HDD 150A, HDD 150B, SSD 160A, and SSD 160B.

A typical storage server system can include many more HDDs and/or SSDs than are illustrated in FIG. 1. It should be understood that storage server system 130 may be also implemented using other types of persistent storage devices in place of, or in combination with, the HDDs and SSDs. These other types of persistent storage devices may include, for example, flash memory, NVRAM, micro-electro-mechanical (MEMs) storage devices, or a combination thereof. Storage server system 130 may also include other devices, including a storage controller, for accessing and managing the persistent storage devices. Storage server system 130 is illustrated as a monolithic system, but could include systems or devices which are distributed among various geographic locations. Storage server system 130 may also include additional storage servers which operate using storage operating systems which are the same or different from storage server 140.

According to the techniques described herein, storage server 140 manages a volume as a logical container for data objects which are stored in one or more logical extents. The logical extents each are comprised of storage space provided by one or more of HDD 150A, HDD 150B, SSD 160A, and SSD 160B. Storage server 140 maintains a first and a second index for locating the data objects. The first index maps a range of object identifiers to the second index and the second index indicates the storage locations of the data objects associated with the range of object identifiers. In order to improve system performance, the first index is stored in solid state memory or another type of memory that provides better read performance than a conventional HDD. In some cases, the solid state memory is located in storage server 140. The solid state memory may also be provided by SSD 160A or 160B in some implementations.

Figure 2:
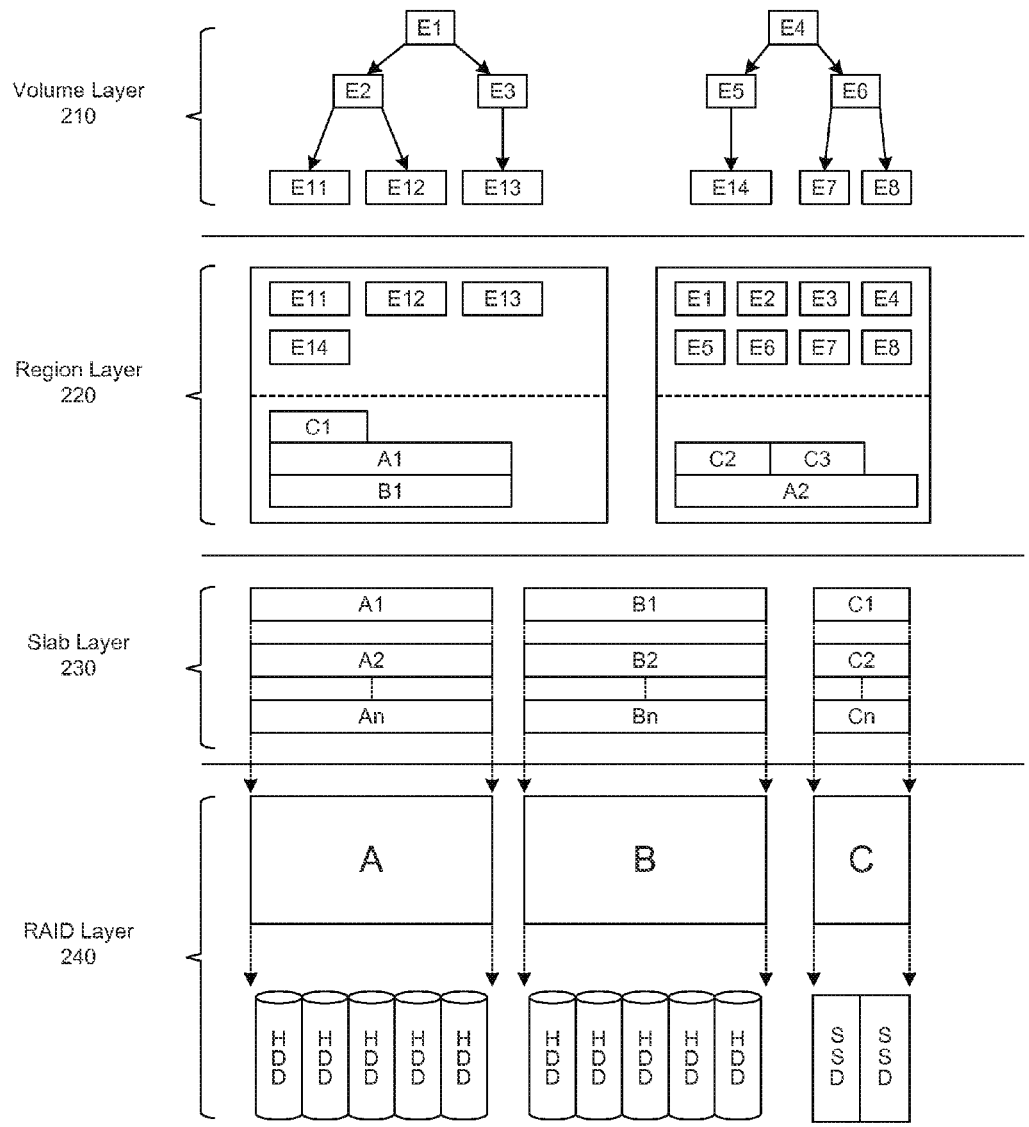
FIG. 2 illustrates various layers of data storage in a data storage system in accordance with the techniques introduced here.

FIG. 2 illustrates various layers of data storage and the relationships between those layers in one example of a data storage system that may be used in accordance with techniques introduced here. The data storage includes several distinct data layers, including: a slab layer 230 which sits on top of a redundant array of independent disks (RAID) layer 240, a region layer 220 which sits on top of slab layer 230, and a volume layer 210 which sits on top of region layer 220. In one embodiment, these layers are implemented by storage server 140.

RAID layer 240 includes RAID parity groups which are made up of HDDs. RAID layer 240 may also optionally include SSDs as illustrated. The system divides RAID parity groups into two-dimensional arrays of storage blocks. The two-dimensional arrays of storage blocks are allocated to various slabs at slab layer 230. The system further defines multiple regions at region layer 220. One or more slabs from slab layer 230 are allocated to each region in region layer 220. As illustrated, each region can use the slabs to support one or more logical extents (e.g., E1, E2, etc.). Consequently, each logical extent is allocated at least a portion of one or more of the slabs that are allocated to the region that includes the logical extent. Each slab may also have portions that are allocated to different extents of the region.

The system maintains one or more volumes, or file systems, as logical containers of data in volume layer 210. Each volume in volume layer 210 includes one or more of the logical extents from one or more of the regions in region layer 220. Region layer 220 hides the layouts of the logical extents within the various regions from the volumes of volume layer 210, as well as from clients and users of the system. Any given region can include extents built from slabs of two or more different types of physical storage devices, such as flash memory, SSDs, HDDs, or other storage devices. Regions may be logically configured to meet various specifications or performance needs by selecting slabs with various characteristics from slab layer 230. The regions may also be logically reconfigured as those specifications or performance needs changes.

The extents which make up a volume may be selected or allocated from among pools in regions which have been configured to have various characteristics. Volumes may be configured to be of a particular type or class and may be associated with a range of service level objectives (SLOs). One volume type might implement conventional network file system (NFS) type file services, while another might provide access to LUNs, and another might implement an object store for use by content repositories.

In some cases, a region may allocate extents as contiguous storage from the slab layer. Allocation of contiguous space improves read performance for the region. For some applications, allocation of large extents (i.e., gigabytes) improves storage space efficiency. Efficiency is improved because metadata is necessary to track each extent and its contents and a small number of extents results in a reduction of the total amount of metadata required for a region to track its extents.

Figure 3:
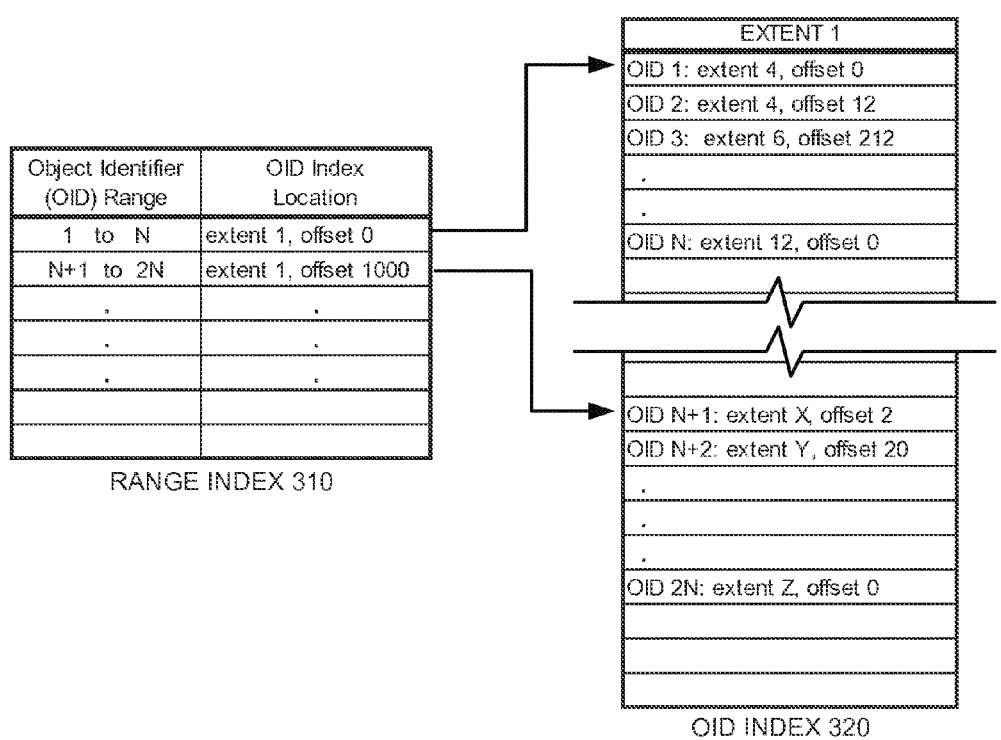
FIG. 3 illustrates a method of using two indexes for maintaining a volume as a logical container for data objects in accordance with the techniques introduced here.

FIG. 3 illustrates a method of using two indexes to maintain a volume as a logical container for data objects in accordance with the techniques introduced here. In this example, the first of the two indexes is range index 310. The second of the two indexes is object identifier (OID) index 320. Range index 310 and OID index 320 are used by a storage system manager for locating data objects stored within extents that are allocated to the volume. OID Index 320 is also stored in one of the extents of the volume. The volume may have many extents, but only a single extent of the volume is included in the illustration.

Each of the data objects stored in the volume is assigned a unique OID. The OID is assigned when the data object is initially stored to the volume or when the volume is created. In one implementation, the OIDs are numerical values. Range index 310 contains entries for ranges of OIDs. Range index 310 contains entries for two ranges of OIDs. The first range pertains to data objects in the volume with OIDs in the range 1 to N. The second range in range index 310 pertains to data objects in the volume with OIDs in the range N+1 to 2N, where N can be any arbitrary number. Only two ranges are illustrated in FIG. 3 for purposes of clarity, but many more entries for additional ranges are possible. The entries may pertain to ranges of varying sizes and are not limited to a size N or to being the same size. Notably, range index 310 does not contain individual entries for each data object. The first entry in range index 310 is applicable to a group of objects with OIDs in the range 1 to N.

Range index 310 includes an OID index location associated with each of the ranges of OIDs. The OID index location indicates, points to, or refers to a location of an OID index entry for the associated range of OIDs. The OID index location entry in range index 310 is not an indication of an absolute location of the objects associated with the OIDs in the range.

In the example of FIG. 3, the OID index location entry includes identification of an extent and an offset within the identified extent. It is at this identified location where a second index entry associated with the OID range begins. It should be understood that the OID index location entry for a range of OIDs may use other methods of designating the OID index entry for the range of OIDs. For example, for OID range 1 to N, rather than pointing to "extent 1, offset 0," range index 310 may point to an absolute storage location, a specific memory address, or a storage location which is not within the volume.

A data object in the volume which is identified as OID 1 can be located and retrieved as follows. Since the OID of the data object falls within the range of the first entry in range index 310 (1 to N), the OID index location for this OID is "extent 1, offset 0." The system then reads from a first storage location associated with offset 0 of extent 1. As described previously, "extent 1" does not refer to a specific physical location, but refers to a logical location as defined by the volume/region/slab system described previously. The designated storage location, "extent 1, offset 0," in OID index 320 contains entries which specify storage locations of each of data objects associated with each of the OIDs in the range 1 to N. In this case the requested data object is the first in the range so the storage location will be included in the first entry at extent 1, offset 0. This first entry indicates that data object OID 1 is stored at "extent 4, offset 0." The data object can be retrieved by accessing and reading the storage location at extent 4, offset 0 (not pictured).

For purposes of comparison, the data object in the volume which is identified as OID 3 can be located and retrieved as follows. Since the OID falls within the range of the first entry in range index 310, the OID index location for this OID is "extent 1, offset 0." The system then reads from a storage location associated with offset 0 of extent 1. It should be noted that, up to this point, the process does not differ from that described above with respect to OID 1 . This is because OID 1 and OID 3 both fall within the range 1 to N (assuming N≥3) and range index 310 does not contain information specific to individual OIDs. The designated storage location, "extent 1, offset 0," in OID index 320 contains entries which specifies the storage location of each of the OIDs in the range 1 to N. In this case the requested data object is the third in the range so the storage location of the data object will be found in the third entry starting from extent 1, offset 0. This third entry indicates that data object OID 3 is stored at "extent 6, offset 212." The data object can be retrieved by accessing and reading the storage location at extent 6, offset 212 (not pictured). In some examples, one or more of the index entries may also contain information indicated a length of the data stored at the designated location.

Objects that fall within the range N+1 to 2N are located and retrieved in a manner similar to those described above. For example, a data object with OID N+2 is associated with the second entry in range index 310 because it falls within the range N+1 to 2N. The OID index location for this range of OIDs is "extent 1, offset 1000." The second entry starting from extent 1, offset 1000, is accessed in order to determine the storage location of data object OID N+2. In this case, the storage location for the data object is extent Y, offset 20.

Range index 310 is relatively small compared to an index or table which contains an entry for every individual OID of a volume because each entry pertains to a range of OIDs. Because it is small, range index 310 may be maintained in solid state memory or other memory of the system which does not require an I/O to access, rather than being stored in an extent or other disk-based storage location. This means that the first step of the two step index lookup processes described above may be performed without performing a disk I/O. A data object may therefore be retrieved with only two disk I/Os. The first disk I/O occurs when the system uses the information retrieved from range index 310 to access OID index 320. Using the information from OID index 320, the system performs a second disk I/O to retrieve the data object from the specified location.

The inodes and the inode structure of conventional file systems are typically too large to store in solid state memory of the system. Since solid state memory has a much lower latency than disk based devices, particularly for random accesses, performing storage operations with fewer disk I/Os can provide significant performance benefit. While the SSDs of FIGS. 1 and 2 are sometimes configured to perform a function similar to that performed by HDDs, the performance improvement they provide over conventional magnetic based disk storage devices is such that storage of one or more of the indexes in an SSD can provide performance improvements of the typed described herein. Even though accessing data in an SSD is an I/O, it is an I/O that can typically be performed more quickly than an HDD I/O. Therefore, benefits associated with the invention provided herein may still be realized if the first index is stored in an SSD. Even though this configuration requires three I/Os to access a data object, the first is an SSD I/O which does not have the inherent latencies associated with disk-based devices.

The offsets referenced in the examples above refer to a specific storage location within an extent. In some cases, an offset refers to a block of storage space of a fixed size. For example, each offset may be a 4 Kbyte block of storage space. In this example, extent 6, offset 212, would refer to storage at an address which is 848 KB from the start of extent 6 (offset 212×4K=848K). Offsets may be of other sizes, including variable sizes. In the case of variable size offsets, other indicators or information may be necessary to indicate where offsets start and end.

The information included in range index 310 and OID index 320 may be formatted or encoded in many different ways. The formats illustrated in FIG. 3 are provided for illustration purposes. A description of all of the possible ways in which the information in range index 310 and OID index 320 may be formatted or encoded is beyond the scope of this description. The invention is not to be limited to format provided in FIG. 3 or to any other specific format.

Range index 310 may also include other information pertaining to each of the ranges of OIDs. In one example, OID ranges may be segregated by SLO or by region type and this information could be also be stored in range index 310. The OID ranges may also be segregated for multi-tenancy where use by different users or groups is indicated in range index 310. Similarly, the entries in OID index 320 may also include metadata associated with each of the data objects. However, it is a further objective of the present invention to reduce the amount of metadata associated with each data object in order to lower the metadata-to-data ratio and further improve storage efficiency. For example, basic attributes, such as size, may be stored in OID index 320, while other attributes such as owner, creation time, access time, etc., are stored elsewhere (e.g., in the data object itself, or in another data object associated with the data object).

Figure 4:
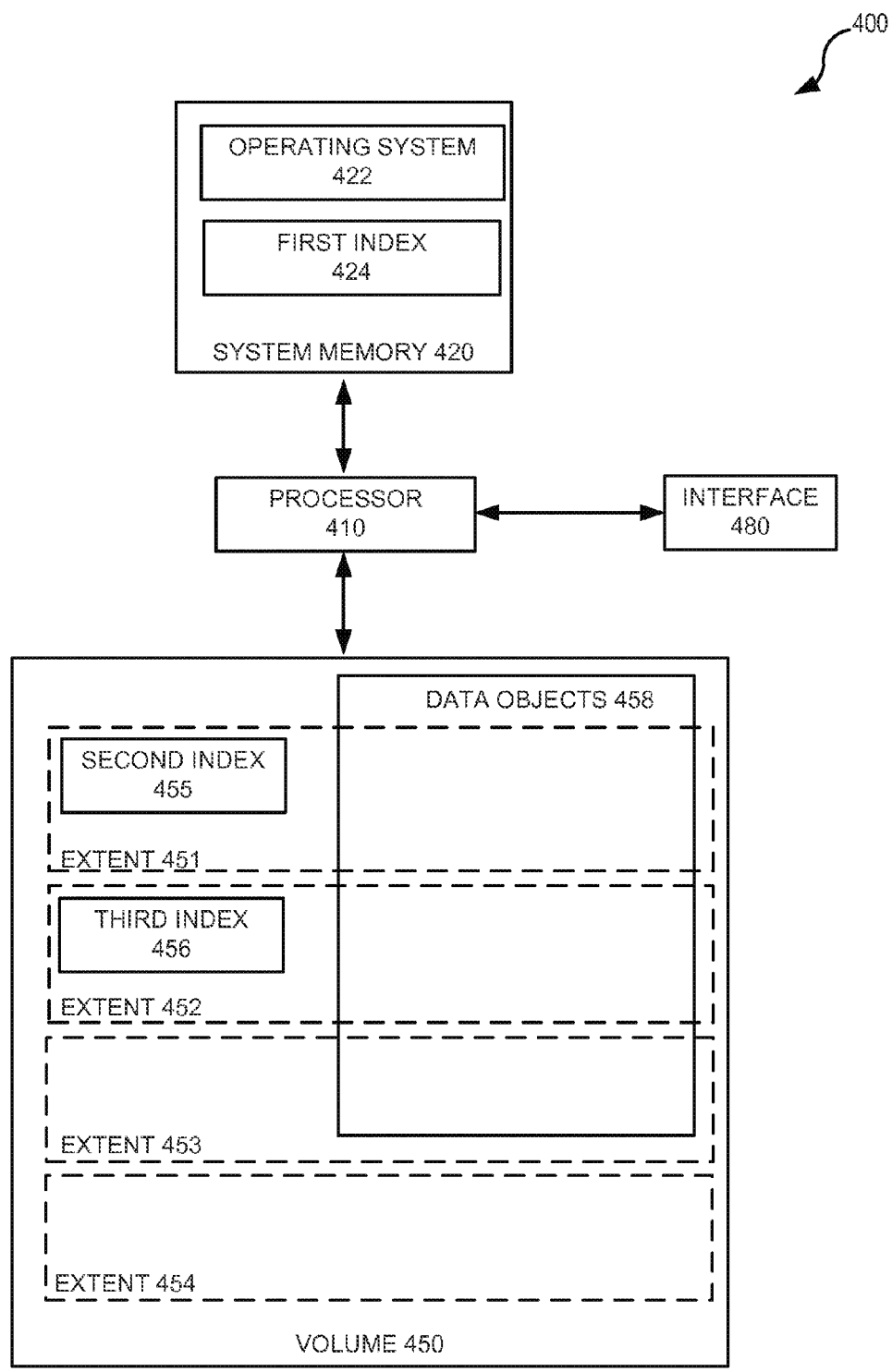
FIG. 4 illustrates a data storage system implementing the techniques introduced here.

FIG. 4 illustrates data storage system 400 in which the techniques introduced here may be implemented. Data storage system includes processor 410, interface 480, system memory 420, and volume 450. Processor 410 may be any type of computer, microprocessor, central processing unit (CPU), or programmable logic, including combinations thereof. Interface 480 enables processor 410 to communicate with other devices, systems, clients, networks, or combinations thereof. Interface 480 is illustrated as a single interface but could comprise multiple interfaces to different devices or systems.

System memory 420 may be any type of solid state memory used for computing purposes including random access memory (RAM), non-volatile memory RAM (NVRAM), dynamic RAM (DRAM), or flash memory, including combinations thereof. System memory 420 includes operating system 422 and first index 424. First index 420 is an example of range index 310. System memory 420 may also include other programs or applications which are used in performing storage operations.

Volume 450 is a logical container for data objects stored by data storage system 400. Volume 450 includes logical extents 451-54. Volume 450 may also include other logical extents or other storage space allocated by other means. Multiple data objects are stored in volume 450. For purposes of illustration, these data objects are collectively referred to as data objects 458. The individual data objects which comprise data objects 458 are each stored in one or more of extent 451-53. Each of extents 451-54 comprises one or more slabs, where each slab is defined as a set of blocks of storage in one or more physical storage devices, such as HDDs. In some examples, data storage system 400 may include additional volumes.

Extent 451 includes second index 455. Second index 455 is an example of OID index 320. Extent 452 includes third index 456. Third index 456 may be an example of another OID index similar to second index 455 or may be an index used for other purposes as described in subsequent examples.

Figure 5:
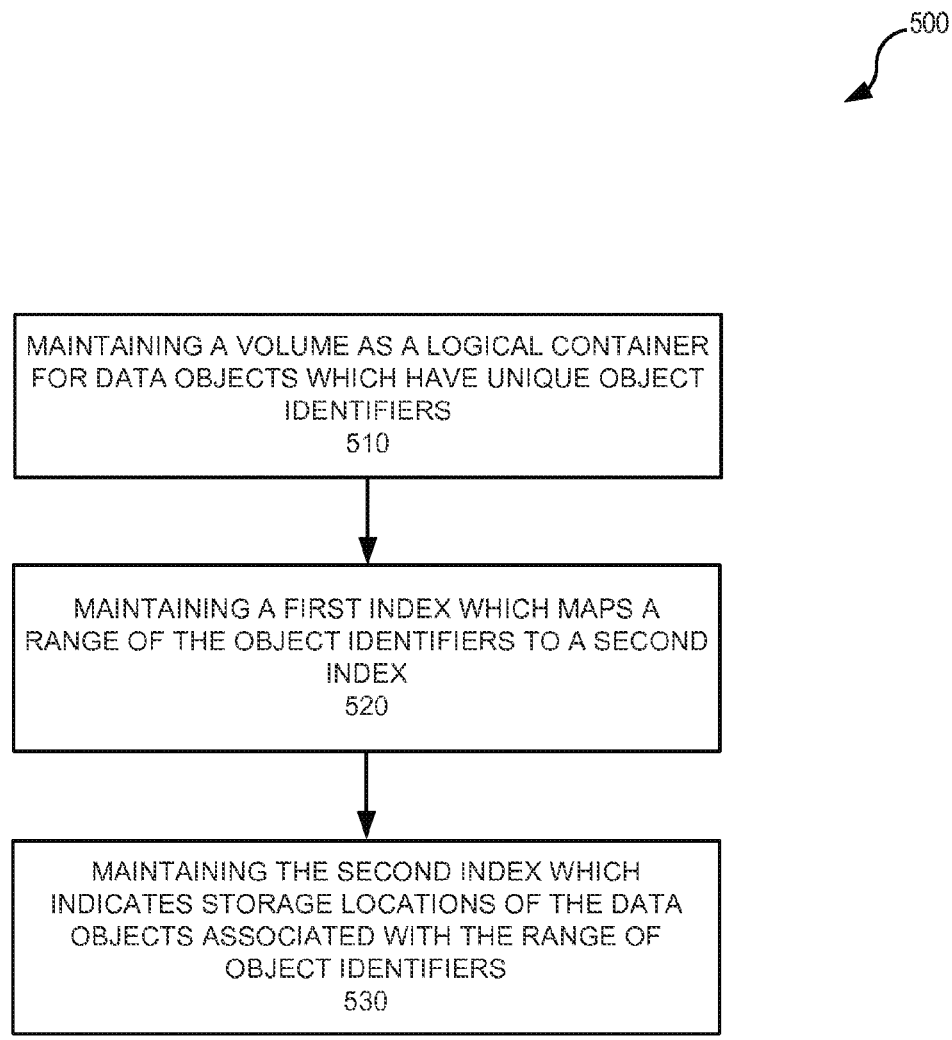
FIG. 5 illustrates a method of operating a data storage system in accordance with the techniques introduced here.

FIG. 5 illustrates method 500 of operating a data storage system implementing the techniques introduced here. Method 500 is described with respect to operation of data storage system 400, but could also be applied for use with other types of data storage systems or with other configurations of data storage system 400.

Method 500 includes maintaining volume 450 as a logical container for data objects 458 in data storage system 400. Data objects 458 are stored in one or more of logical extents 451-453. Data objects 458 are each uniquely identified by an OID (step 510). Method 500 includes maintaining first index 424 and second index 455 for locating individual data objects within data objects 458. First index 424 maps a range of the OIDs to second index 455 (step 520). Second index 455 indicates storage locations of individual data objects of data objects 458 associated with the range of the OIDs (step 530).

In one variation of data storage system 400, volume 450 is defined as append-only. This means that data objects 458, and any other data objects stored in volume 450, may be appended, but may not be modified. Modification requires creation of a new data object. This configuration is suitable for applications where data objects are typically written once and frequently accessed randomly with few or no requests to modify them (i.e., photo storage in social media platforms). This append-only implementation allows the range and OID indexes to be more efficiently managed and provides more efficient overall use of the available storage space. This implementation is more efficient because overwrite support requires support for modification of existing ranges (e.g., an extent mapping for an overwritten data object may need to be split into two segments). This results in more metadata than is necessary if the data object is written contiguously. In other words, appending is more efficient than overwriting from the standpoint of metadata because it requires adding new mappings, rather than modifying old mappings.

The examples herein primarily describe implementations in which the range index is stored in system memory or solid state memory in order to improve performance of the system. However, a backup copy of the range index will typically also be stored in disk-based storage, possibly including storage in one or more extents, for reliability purposes. The range index needs to be stored in nonvolatile storage in order to facilitate system recovery after a system shutdown, failure, or unexpected event. Consequently, a working copy of one or more range indexes may be stored in system or solid state memory while the primary instance is stored in one or more extents. When changes to a range index are necessary, the changes may be made to copy in system or solid state memory with those changes being flushed to the disk-based copy on a periodic basis. The range index may also be stored in NVRAM in order to avoid loss of the range index, or loss of recent changes to the range index, in the event of power loss or system failure.

The file system layouts described in the examples above provide a space-efficient metadata structure in both the system memory and the disk based storage space (i.e., in both indexes). For example, in a system using 4 KB disk pages, each page may contain 128 OID index entries (assuming 32 byte entries). Alternately, each 4 KB disk page may contain 202 range index entries (assuming 20 byte entries). In this example, the system needs only approximately 163 MB to store the range index and approximately 32 GB to store the OID index for 1 billion data object entries. The OID requires such a small amount of disk space that it can be stored in system memory. The techniques described herein are not limited to the specific entry or disk page sizes discussed in the examples above. Similar results will be realized when other entry sizes are utilized.

Figure 6:
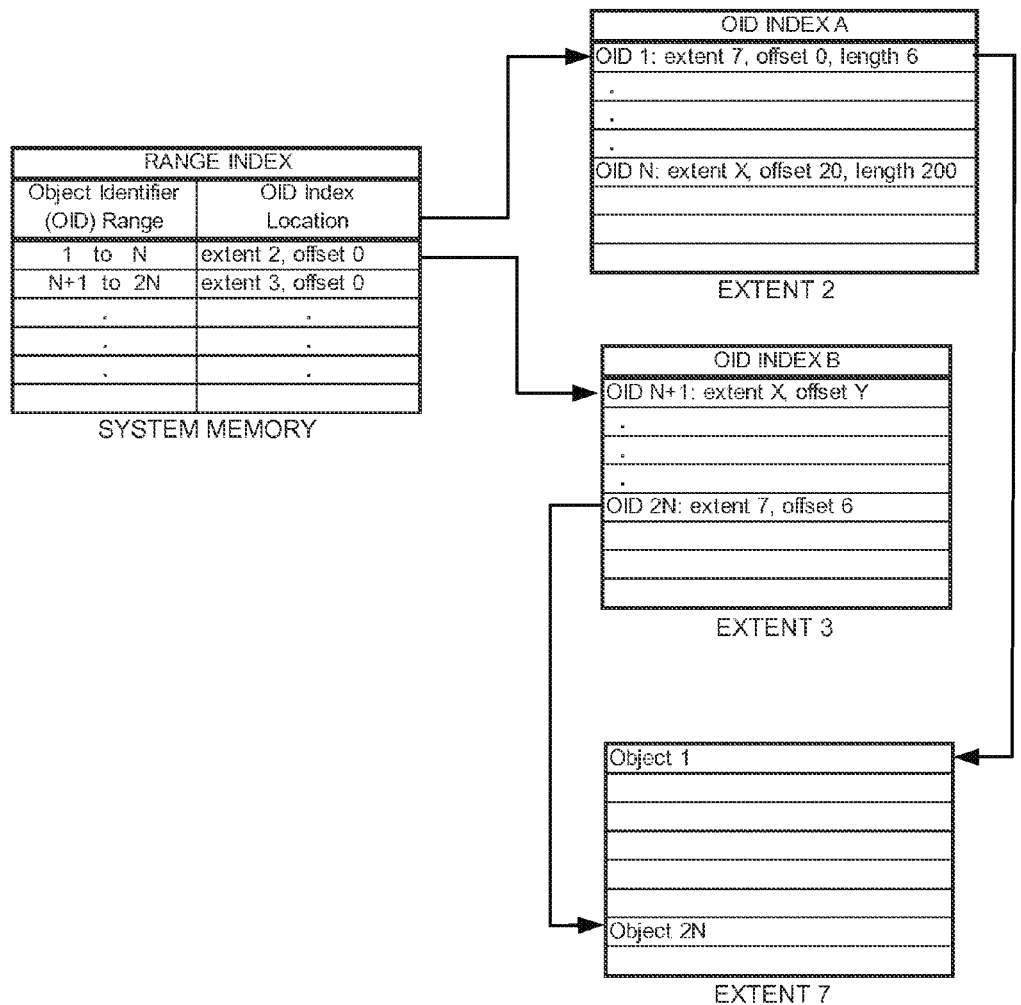
FIG. 6 illustrates a method of using indexes that are stored in multiple extents for maintaining a volume as a logical container for data objects in accordance with the techniques introduced here.

FIG. 6 illustrates a method of using indexes that are stored in multiple extents for maintaining a volume as a logical container for data objects in accordance with the techniques introduced here. The range index of FIG. 6 contains two entries. One entry for data objects with OIDs in the range 1 to N and a second entry for data objects with OIDs in the range N+1 to 2N. The OID index location for the first range of OIDs is "extent 2, offset 0." The OID index location for the second range of OIDs is "extent 4, offset 0." Consequently, when the system is retrieving a data object with an OID in the range 1 to N, it is directed to OID Index A in extent 2 to find the location of the data object. When the system is retrieving a data object with an OID in the range N+1 to 2N, it is directed to OID index B in extent 4. The range index is maintained in system memory, solid state memory, or another memory with low latency access in order to allow the first step of the data object retrieval process to be performed without performing a disk I/O.

OID index A includes individual storage location entries, starting at offset 0, for each of the data objects associated with the first range. The data object associated with OID 1 is located at extent 7, offset 0. In contrast to the example of FIG. 3, the associated data object is located in a different extent than the OID index. At the same time, data objects associated with other OIDs in the same range may be located in other extents. For example, the data object associated with OID N is located in extent X (not pictured). Each of the entries in OID index A also includes a length of the associated data object. The length may be indicated in blocks or in some other unit of measurement used by the system.

The range index entry for OID range N+1 to 2N indicates that the OID index for this range is located in extent 3. As with OID index A, OID index B contains individual entries for each of the OIDs of the range indicating the storage locations of the associated data objects. OID indexes which are stored in two different extents may indicate storage locations of objects which are stored in the same extent. For example, the OID index entries associated with OID 1 and OID 2N are in two different OID indexes, which are stored in two different extents, even though data object 1 and data object 2N are both stored in extent 7. The OID index entries of OID index B do not include length indicators. In this case, the system may determine the length of the data object based on information available in the data object itself. OID index A and OID index B start at offset 0, of extents 2 and 3, respectively. While placing OID indexes at offset 0 may be preferred for system management reasons, it is also possible to place them at any offset within an extent.

Figure 7:
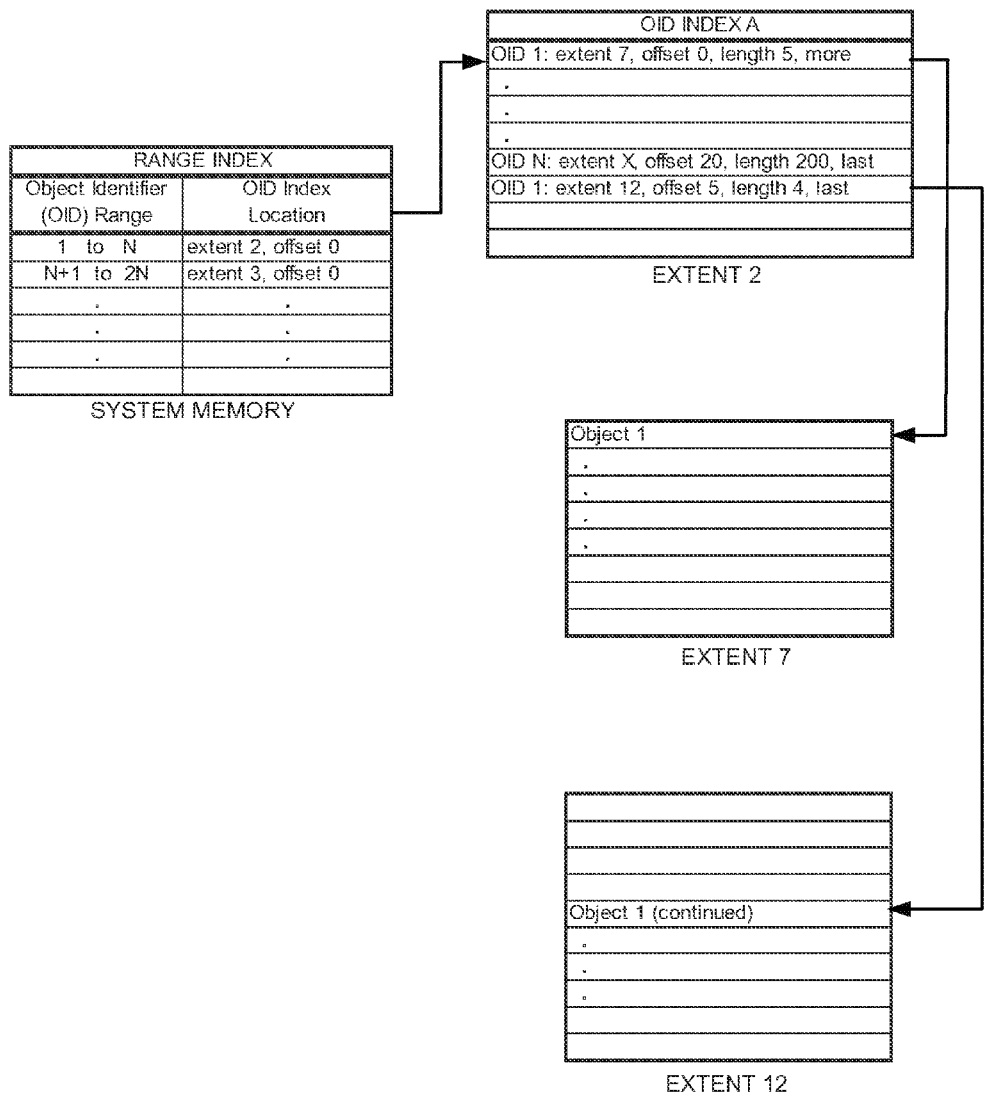
FIG. 7 illustrates a method of using indexes for maintaining a volume which contains a fragmented data object.

FIG. 7 illustrates a method of using indexes for maintaining a volume which contains a fragmented data object. In addition to the OID index information described in previous examples, each entry in OID index A also contains a flag indicating "more" or "last." The "more" flag indicates that the associated data object is fragmented (i.e., it has two or more portions that are stored in different locations). This may occur because the data object was appended or overwritten at some point after its initial, unfragmented storage or because it was fragmented at the time of its initial storage in order to take advantage of a bounded block of storage space (i.e., a hole) that was available. "More" and "last" are used descriptively for purposes of illustration and the management of whether there are additional OID index entries associated with a particular OID index entry can be implemented in many ways.

OID index A indicates that OID 1 is stored starting at offset 0 of extent 7. The portion stored at the location has a length of 5. The "more" flag on the OID index entry indicates that there are additional OID index entries associated with OID 1. The second entry is also included in OID index A and indicates that a second portion of OID 1 is stored at offset 5 of extent 12 and has a length of 4. This entry includes a "last" flag which indicates that it is the last OID index entry for OID 1. Therefore, there is no need to search for additional OID index entries for OID 1. The system must retrieve both the portion in extent 7 and the portion in extent 12 when retrieving data object OID 1. A data object may be broken into more than two portions. Multiple portions of a data object may also be stored in the same extent.

Beneficially, the existence of multiple OID index entries for one or more objects does not affect the range index. The range index only indicates the start location of the OID index for a range of data objects. Therefore, when a data object is appended, an additional entry in the OID index does not necessitate a change to or expansion of the range index. Keeping the range index as compact as possible allows it to be maintained in system memory as discussed previously.

Figure 8:
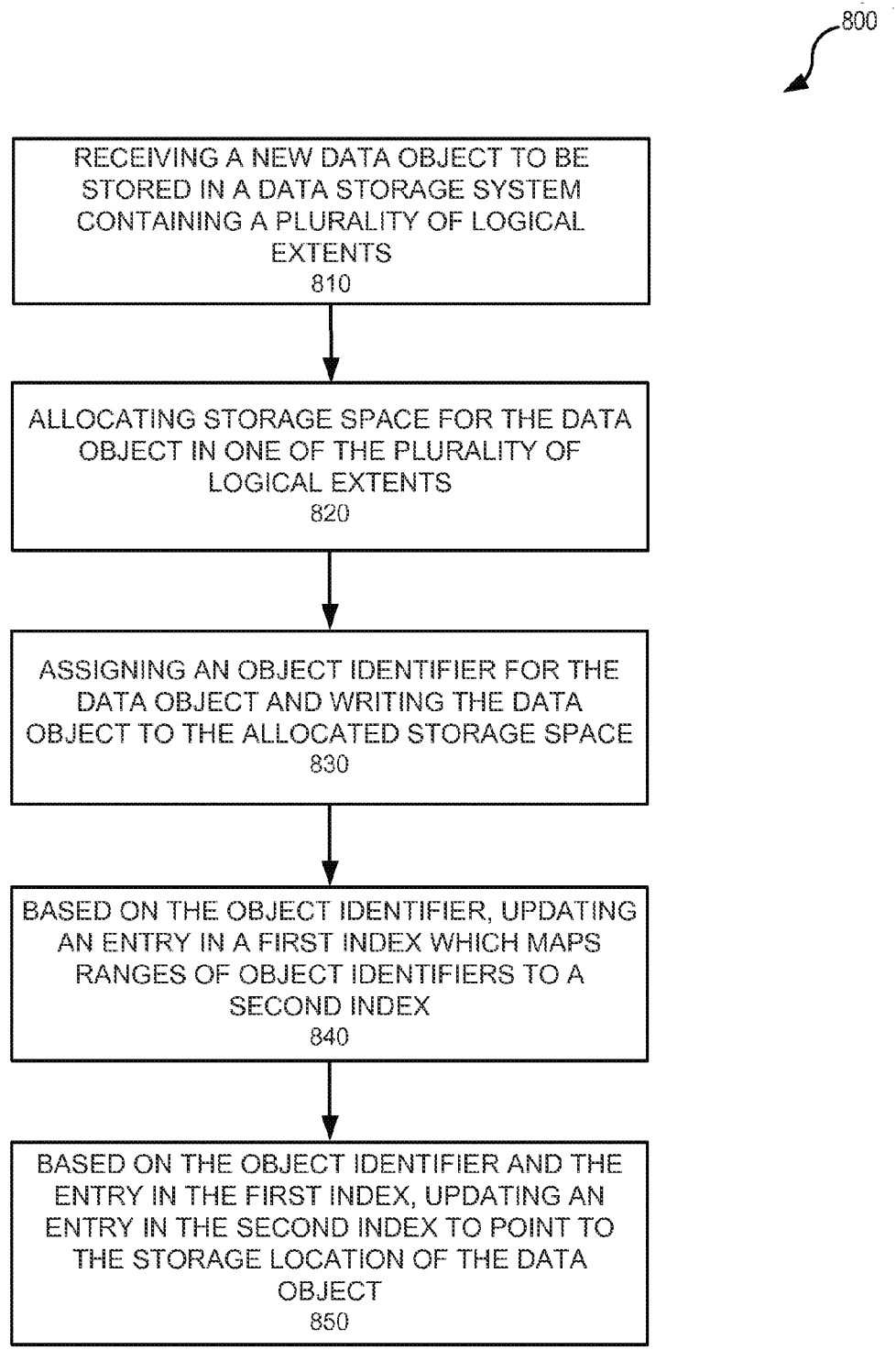
FIG. 8 illustrates a method of operating a data storage system in accordance with the techniques introduced here.

However, when the system is writing a new data object, the range index may need to be updated to accommodate the new object. FIG. 8 illustrates method 800 of operating a data storage system for writing a new data object. The system receives a new data object from a client to be stored in the data storage system (step 810). The system allocates storage space in one of the plurality of logical extents for the new data object (step 820). In some cases, although not preferred, a new data object may be stored in a fragmented manner as discussed with respect to FIG. 7. An object identifier is assigned to the new data object and it is written in the allocated storage space (step 830).

Depending on the new OID, the range index may need to be updated (step 840). If the new OID is not within the range of an existing entry in the range index, a new entry may be created. For example, with respect to FIG. 7, if the new data object has an OID of 2N+1, there is no existing entry in the range index for it. Therefore, a new entry would have to be created in the range index to cover a range of OIDs which includes 2N+1. In the case where the OID of the new data object falls within an existing range in the range index, a new entry may not need to be created. For example, if the new data object has an OID of 2N−1, it is already addressed by the existing second entry in the range index.

Finally, the entry in the OID index is updated to reflect the storage location of the new data object (step 850). The updating involves adding one or more new entries to one or more OID indexes to reflect the location of the new data object, or the locations of the fragments, of the new data object.

The system may perform the process of writing new data objects using delayed write allocation. Delayed write allocation is a process in which storage space for a new data object in the extent(s) is not allocated and/or written until all of the blocks associated with the data object have been received and are ready to be written. The allocation/write process may also be delayed until all metadata or information associated with the data object has also been received. The storage space requirements of the data object are known before the allocation or write processes being. Delayed write allocation improves data layout because it improves the system's ability to allocate contiguous storage space for the new data object. Contiguous storage space improves read performance for the data object. In many cases, the system preferably stores a data object contiguously in a single extent for better read performance and to reduce the amount of associated metadata. However, because extents are logically defined, storage space in two different extents may actually be physically contiguous storage space.

To facilitate delayed write allocation, the system may utilize a write cache which stores received blocks or fragments of a newly created data object until it is complete, or for a specified period of time. The write cache may be implemented in a nonvolatile memory such that the write request from the client for the new data object can be confirmed to the client after the new data object is placed into the write cache, but before it has been written to the one or more allocated extents. Doing so not only allows the access latency of the disk-based devices to be eliminated from the client response time, but also enables the system to prioritize disk operations in a more flexible manner which does not affect the client response time. The delayed write allocation and write caching processes described here are not only applicable to creation of new data objects but may also be used when appending existing data objects.

FIG. 9 is a block diagram of a storage server 900 that can be used to implement components of a storage system. For example, the system of FIG. 9 can be used to implement a client system, a computer, a network device, or a storage server. Storage server 140 of FIG. 1 is an example of storage server 900 although other configurations and operations are possible. In an illustrative embodiment, storage server 900 includes one or more processor(s) 910, memory 920, a network adapter 940, and a storage adapter 950, all interconnected by an interconnect 960.

Memory 920 includes storage locations that are addressable by processor(s) 910 and adapters 940 and 950 for storing software program code and data structures associated with the techniques introduced here. Processor(s) 910 and adapters 940 and 950 may, in turn, include processing elements and/or logic circuitry configured to execute the software code and manipulate the data structures. It will be apparent to those skilled in the art that other processing and memory implementations, including various machine-readable storage media, may be used for storing and executing program instructions pertaining to the techniques introduced here.

Network adapter 940 includes a plurality of ports to couple storage server 900 with one or more other systems over point-to-point links, wide area networks, virtual private networks implemented over a public network, or a shared local area network. Network adapter 940 can include the mechanical components and electrical circuitry needed to connect storage server 900 to a network such as network 190. One or more systems can communicate with other systems over network 190 by exchanging packets or frames of data according to pre-defined protocols, such as TCP/IP.

Storage adapter 950 interfaces with an operating system running on processor(s) 910 to access information on attached storage devices. The information may be stored on any type of attached array of writable storage media, such as HDDs, magnetic tape, optical disk, flash memory, SSDs, RAM, MEMs and/or any other similar media adapted to store information. Storage adapter 950 includes a plurality of ports having I/O interface circuitry that couples with disks or other storage related devices over an I/O interconnect arrangement.

Embodiments of the present invention include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, and/or firmware.

Embodiments of the present invention may be provided as a computer program product which may include a machine-readable medium having stored thereon non-transitory instructions which may be used to program a computer or other electronic device to perform some or all of the operations described herein. The machine-readable medium may include, but is not limited to optical disks, compact disc read-only memories (CD-ROMs), magneto-optical disks, floppy disks, ROMs, RAMs, erasable programmable read-only memories (EPROMs), electrically erasable programmable read-only memories (EEPROMs), magnetic or optical cards, flash memory, or other type of machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link.

The phrases "in some embodiments," "according to some embodiments," "in the embodiments shown," "in other embodiments," "in some examples," and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the claims.

What is claimed is:

1. A method, comprising:
   in a data storage system, maintaining a logical container for a plurality of data objects, wherein the data objects are stored in one or more of a plurality of logical extents of the data storage system and the data objects are uniquely identified by object identifiers; and
   maintaining first and second indexes for locating the data objects, wherein:
      the first index maps a first range of the object identifiers to the second index; and
      the second index indicates storage locations of the data objects associated with the first range of the object identifiers wherein:
         the first index maps a second range of the object identifiers to a third index; and
         the third index indicates storage locations of each of the data objects associated with the second range of the object identifiers.

2. The method of claim 1, wherein the first index is stored in a solid state memory of the data storage system and the second index is stored in an extent of the plurality of logical extents.

3. The method of claim 1, wherein the plurality of logical extents each comprises at least a portion of one or more slabs, each slab defined as a set of blocks of storage in one or more physical storage devices.

4. The method of claim 1, wherein the second index and the third index are stored in different logical extents.

5. The method of claim 1, wherein the first index maps the first range of the object identifiers to the second index by providing:
   an identifier for an extent in which the second index is stored; and
   an offset within the extent in which the second index is stored.

6. The method of claim 5, wherein indicating the storage locations of the data objects includes providing:
   identifiers of extents in which each of the data objects of the first range are stored;
   offsets within each of the extents in which each of the data objects of the first range are stored; and
   lengths of each of the data objects of the first range.

7. The method of claim 1, wherein the storage locations of the data objects indicated in the second index are arranged in sequential order based on the associated object identifiers.

8. The method of claim 1, further comprising:
   receiving a client request for one of the data objects;
   selecting, from among the first range and the second range, a range associated with the requested data object;
   determining a storage location of the requested data object from the second index if the selected range is the first range or determining the storage location of the requested data object from the third index if the selected range is the second range; and
   retrieving the requested data object from the determined storage location.

9. The method of claim 1, further comprising:
   receiving a new data object from a client to be stored in the data storage system;
   allocating storage space in one of the plurality of logical extents;
   writing the new data object to the allocated storage space; and
   updating the first and the second indexes based on a location of the allocated storage space.

10. The method of claim 9, wherein the new data object is received from the client as a plurality of blocks and the storage space is not allocated until all of the blocks are received.

11. A data storage system, comprising:
    a system memory;
    a plurality of logical extents, wherein one or more blocks of storage in one or more physical storage devices are allocated to each of the plurality of logical extents; and
    a processor configured to:
       maintain a volume as a logical container for a plurality of data objects, wherein the volume includes one or more of the logical extents;
       store data objects in one or more of the plurality of logical extents, wherein the data objects are uniquely identified by object identifiers;
       maintain a first index, wherein the first index is stored in the system memory and maps a first range of the object identifiers to a second index; and
       maintain the second index, wherein the second index is stored in a logical extent of the logical extents and indicates storage locations of the data objects associated with the first range of the object identifiers wherein:
          the first index maps a second range of the object identifiers to a third index; and
          the third index indicates storage locations of each of the data objects associated with the second range of the object identifiers.

12. The data storage system of claim 11, wherein the second index and the third index are stored in different logical extents.

13. The data storage system of claim 11, wherein the first index maps the first range of the object identifiers to the second index by providing:

an identifier for an extent in which the second index is stored; and an offset within the extent in which the second index is stored.

14. The data storage system of claim 13, wherein indicating the storage locations of the data objects includes providing:
   identifiers of extents in which each of the data objects of the first range are stored;
   offsets within each of the extents in which each of the data objects of the first range are stored; and
   lengths of each of the data objects of the first range.

15. The data storage system of claim 11, wherein the storage locations of the data objects indicated in the second index are arranged in sequential order based on the associated object identifiers.

16. The data storage system of claim 11, wherein, in response to a client request for a data object, the processor is further configured to:
   select, from among the first range and the second range, a range associated with the requested data object;
   determine a storage location of the requested data object from the second index if the selected range is the first range or determine the storage location of the requested data object from the third index if the selected range is the second range.

17. The data storage system of claim 11, wherein the processor is further configured to:
   receive a new data object from a client to be stored in the data storage system;
   assign a new object identifier to the new data object;
   allocate storage space in one of the plurality of logical extents;
   write the new data object to the allocated storage space; and
   update the first and the second indexes.

18. The data storage system of claim 17, wherein the new data object is received from the client as a plurality of blocks and the storage space is not allocated and the data object is not written until all of the blocks are received.

19. The data storage system of claim 11, wherein additional metadata associated with one of the data objects is stored with the data object.

20. A non-transitory machine-readable medium comprising instructions that, when executed by one or more processors, direct the one or more processors to:
   in a data storage system, define a plurality of regions to contain data objects, the plurality of regions including a plurality of logical extents, wherein allocated to each said logical extent is at least a portion of one or more slabs allocated to a region that includes said logical extent, each said slab defined as a set of blocks of storage in one or more physical storage devices;
   in the data storage system, maintain a plurality of volumes as logical containers of data, each of the volumes including one or more of the logical extents from one or more of the regions, wherein layouts of the logical extents within the regions are not visible to the plurality of volumes; and
   maintain a first index in which a first group of unique object identifiers associated with a first group of the data objects is mapped to a second index and a second group of unique object identifiers associated with a second group of the data objects is mapped to a third index, wherein:
      the first index is stored in solid state memory;
      the second index is stored in one of the logical extents and indicates storage locations of the data objects of the first group; and
      the third index is stored in another of the logical extents and indicates storage locations of the data objects associated with the second group.

21. The non-transitory machine-readable medium of claim 20, wherein the first index maps the first group of the object identifiers to the second index by providing:
   an identifier for an extent in which the second index is stored; and
   an offset within the extent in which the second index is stored.

22. The non-transitory machine-readable medium of claim 21, wherein indicating the storage locations of the data objects includes providing:
   identifiers of extents in which each of the data objects of the first group are stored;
   offsets within each of the extents in which each of the data objects of the first group are stored; and
   lengths of the data objects.

23. The non-transitory machine-readable medium of claim 20, wherein the storage locations of the data objects indicated in the second and the third indexes are arranged in sequential order based on the associated object identifiers.

24. The non-transitory machine-readable medium of claim 20, wherein the instructions further direct the one or more processors to:
   receive a request for a data object from a storage client;
   select, from among the first group and the second group, a group associated with the requested data object; and
   determine a storage location of the requested data object from the second index if the selected group is the first group or determine the storage location of the requested data object from the third index if the selected group is the second group.

25. The non-transitory machine-readable medium of claim 20, wherein the instructions further direct the one or more processors to:
   receive a new data object from a client to be stored in the data storage system, wherein the new data object is received as a plurality of blocks;
   allocate storage space in one of the plurality of logical extents after all of the blocks are received; and
   write the new data object to the allocated storage space.

26. A method, comprising:
   in a data storage system, using a multi-level index for tracking locations of a plurality of data objects stored in a logical data container, the multi-level index including a first index and a second index mapped to the first index;
   maintaining the first index in its entirety in a solid state memory in the data storage system;
   maintaining the second index in a persistent mass storage facility separate from the solid state memory; and
   accessing a logical extent in the persistent mass storage to retrieve one of the plurality of data objects by no more than two storage I/O operations, wherein said accessing includes using information contained in the first index and the second index to identify a storage location of said one of the plurality of data objects wherein:
      the first index maps a second range of the object identifiers to a third index; and
      the third index indicates storage locations of each of the data objects associated with the second range of the object identifiers.

27. The method of claim 26 wherein the plurality of data objects are each uniquely identified by object identifiers and the first index maps a range of the object identifiers to the second index.

28. The method of claim 27 wherein the second index indicates storage locations of the data objects associated with the range.

* * * * *